UNITED STATES PATENT OFFICE.

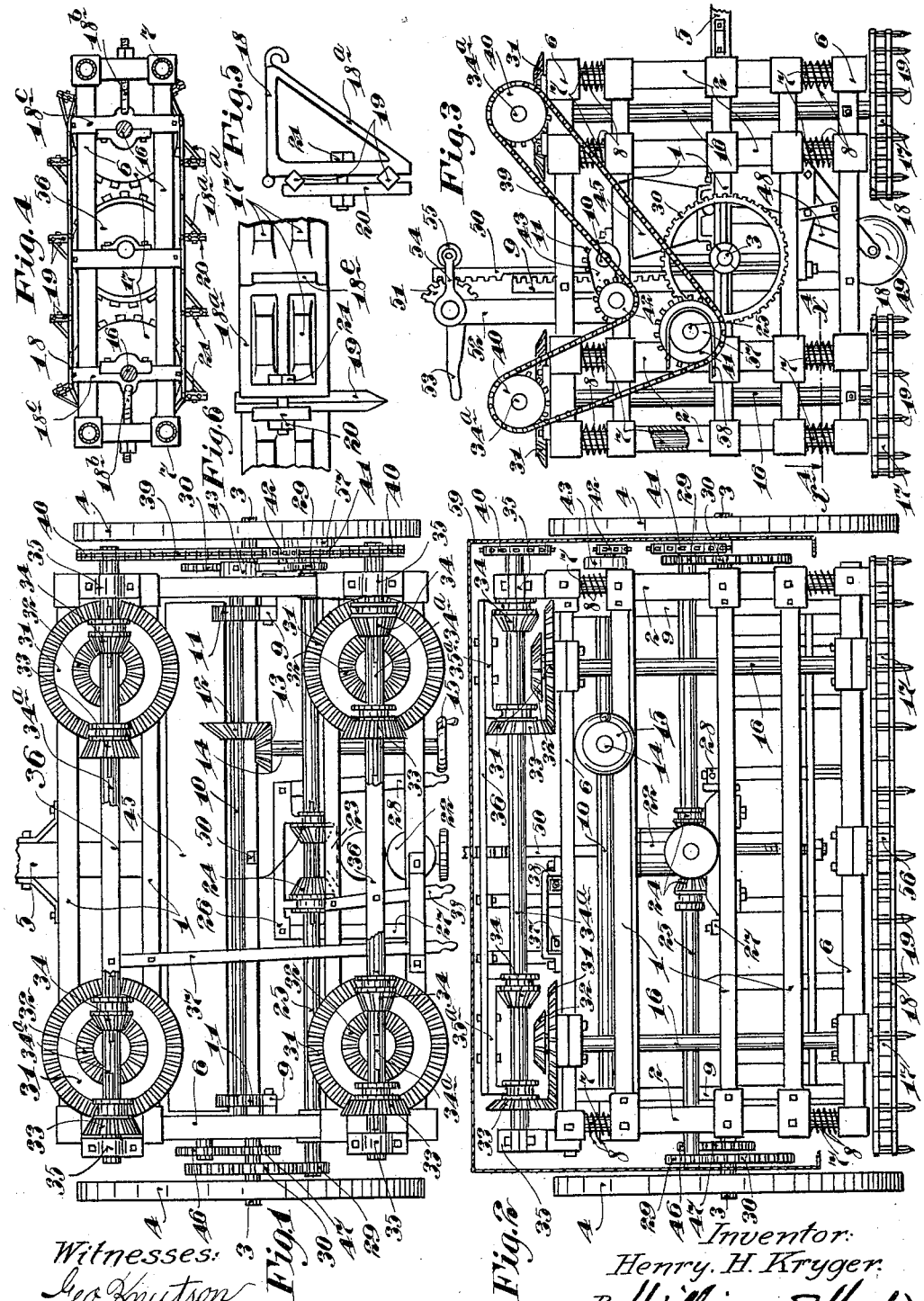

HENRY H. KRYGER, OF MINNEAPOLIS, MINNESOTA.

COMBINED HARROW AND SEEDING-MACHINE.

1,179,532. Specification of Letters Patent. Patented Apr. 18, 1916.

Application filed July 11, 1913, Serial No. 778,607. Renewed September 15, 1915. Serial No. 50,905.

*To all whom it may concern:*

Be it known that I, HENRY H. KRYGER, a citizen of the United States, residing at Minneapolis, in the county of Hennepin and State of Minnesota, have invented certain new and useful Improvements in Combined Harrows and Seeding-Machines; and I do hereby declare the following to be a full, clear, and exact description of the invention, such as will enable others skilled in the art to which it appertains to make and use the same.

My invention has for its object to provide a highly efficient combined harrow and seeding machine adapted for use, at will, either simply to harrow the ground, or to simultaneously harrow the ground, to deposit the seeds in the harrowed ground, and to cover the deposited seeds by a second harrowing action which leaves the ground surface in a finely pulverized, or dust-like form, best adapted to conserve the moisture in the soil, on lines consistent with so-called dry-farming.

The harrows of this improved machine are in the form of endless traveling or rotary rakes which move horizontally and are driven by upright sprocket equipped shafts, making the machine a type designated as an upright harrow.

In the accompanying drawings which illustrate the invention, like characters indicate like parts throughout the several views.

Referring to the drawings: Figure 1 is a plan view of the improved machine, some parts being broken away, and some parts being removed; Fig. 2 is a rear elevation of the machine, some parts sectioned; Fig. 3 is a right side elevation of the machine; Fig. 4 is a detail in horizontal section taken transversely of the machine, approximately on the line $x^4$ $x^4$ on Fig. 3; Fig. 5 is a detail in side elevation showing one of the harrow chain links in plan view, and on a larger scale than in the other views; and Fig. 6 is a detail in side elevation showing the modified form of the harrow chain links adapted to run on the double faced sprocket.

The main frame of the machine is a skeleton rectangular structure made up of a multiplicity of vertically spaced horizontal tie bars 1, that are connected by upright tubular posts 2. At its sides, this main frame is provided with outwardly projecting trunnions, or stub axles 3, on which large traction wheels 4 are journaled. This main frame, and, in fact, the entire machine, is approximately balanced on the said wheels. A pole 5 is secured to the intermediate front portion of the said main frame, and the level of the machine is maintained by the proper adjustment of the front end of the pole, after the plan of a two-wheel cart.

The main frame described, directly carries a vertically adjustable supplemental frame made up of upper and lower rectangular frame sections 6, connected by vertical posts 7, which latter are arranged to slide vertically through the tubular posts 2 of the main frame. Coiled springs 8 which surround the upper and lower portions of the posts or rods 7 and are compressed between the main and supplemental frame, yieldingly hold the supplemental frame in an intermediate position, in respect to the main frame.

For vertically adjusting the supplemental frame in respect to the main frame, I secure rack bars 9 in vertical positions to the sides of said supplemental frame, and on the intermediate upper portion of the main frame, I mount a transverse shaft 10 which has pinions 11 that mesh with the said racks. The shaft 10 also has a beveled gear 12 that meshes with a beveled pinion 13 on the front end of a short horizontal shaft 14, which, at its rear end, has an operating crank 15. By any suitable lock, not shown, the shaft 14 may be secured against rotation, so as to lock the supplemental frame in different vertical adjustments, in respect to the main frame.

In suitable bearings on the upper and lower portion of the supplemental frame, are mounted front and rear pairs of vertical shafts 16, which, as will now be noted, carry and drive the endless harrows, being, for this purpose, provided at their lower ends with large sprockets 17 located below the lowermost portions, both of the main and supplemental frames. Arranged to run over the transversely alined sprockets 17, are front and rear endless sprocket chains 18, the links of which have offset portions 18ª, to which the harrow teeth 19 are rigidly, but detachably secured by clamping plates 20 and nut-equipped bolts 21. The harrow teeth 19 are thus arranged to travel back and forth, transversely of the machine and transversely of the line of travel of the machine, and they are preferably arranged in pairs spaced transversely of the movement of the said chains.

Mounted on the main frame, preferably at the rear thereof, is an explosive engine indicated as an entirety by the numeral 22. The crank shaft of this engine, as shown, is provided with a beveled gear 23 adapted to be thrown into mesh, at will, with either of two beveled pinions 24, that are carried by, but mounted to rotate with a main counter shaft 25. The pinions 24 are adapted to be thrown, alternately, into mesh with the engine driven gear 23, by means of a shipper bar 26, a supporting link 27 and an operating lever 28. Both the link 27 and lever 28 are pivotally supported on the main frame. At its ends, the main counter shaft 25 carries spur pinions 29 that mesh with spur gears 30 connected to the hubs of the traction wheels 4. Means have now been described whereby, from the engine 22, the traction wheels 4 may be rotated, at will, in a direction of movement of the machine either forward or rearward.

To the upper ends of the upright harrow driving shafts 16, are secured relatively large beveled gears 31, and relatively small beveled gears 32. The said gears 31 and 32, respectively, are adapted to be engaged by beveled pinions 33 and 34, mounted to slide upon and rotate with counter shafts 34ª, journaled in suitable bearings 35 on the top of the supplemental frame. The pinions 33 and 34 are arranged to be thrown alternately, or at will, into action on the gears 31 and 32, by shipper yokes 35ª, that engage the grooved hubs of said pinions and are secured in pairs, to tie bars 36. The tie bars 36 extend transversely of the machine, the one at the rear being arranged to control the movements of the rear endless harrow, and the one at the front being arranged to control the movement of the front endless harrow. The front bar 36 is adapted to be moved by a lever 37, and the rear bar 36 to be moved by a lever 38, both of which levers are pivoted to the top of the supplemental frame. The gears 32 and pinion 34 will cause the endless harrow to travel in one direction at a relatively high speed, and the gears and pinions 31 and 33 will cause the said endless rakes to travel at a relatively slow speed in the opposite direction.

The counter shafts 34ª are driven from the main counter shaft 25 through the following connections: A sprocket chain 39 runs over sprockets 40 on the counter shafts 34ª and over the sprocket 41 on the main counter shaft 25. The said sprocket chain also runs under a slack take-up sprocket 42 that is carried by the end of a crank arm 43. This crank arm 43 is secured to one end of the shaft 10, which, it will be remembered, is carried by the main frame. With this crank and gear connection between the rack bar and take-up sprocket 42, the slack of the sprocket chain 39 will be automatically taken up to compensate for vertical movements of the supplemental frame, in respect to the main frame.

For depositing seed at the rear of the front harrow, and in front of the rear harrow, I can employ any suitable mechanism, such for instance, as that employed in the well known single disk and double disk, or shoe drills. Of the parts of this seeding mechanism in so far as they are shown in the drawings, the numeral 45 indicates a seed box carried by the main frame, having preferably, the usual feeding device, including a shaft equipped at its projecting end with a spur gear 46. This spur gear 46 meshes with a spur gear 47 carried by the hub of one of the gears 30, which latter is secured to the hub of the adjacent traction wheel 4.

The numeral 48 indicates one of the seed boots that are suitably pivoted to the main frame, and equipped with furrow forming disks 49. The free rear portions of the seed boots 48 are suitably connected to the lower end of an adjusting rack bar 50, the upper end of which is in mesh with a segmental gear 51, that is pivoted to a standard 52, rigidly secured on the central top portion of the main frame. The segmental gear 51 has a lever 53, by means of which it may be oscillated to raise or lower the seed boots and disks. A suitable lock, not shown, may be provided for locking the lever 53, and hence the seed boots, in raised positions.

The numeral 54 indicates an arm secured with a standard 52 and provided with a guide roller 55 and engageable with a rack bar 50.

As a simple means of taking up the slack of the harrow chains 18, I mount the lower ends thereof in bearings 18ᶜ (see Fig. 4), to slide on transverse lower bars of the supplemental frame and subject to nut-equipped draw bolts 18ᵇ.

In Fig. 4, I have shown an intermediate idle guide sprocket 56, suitably journaled to the lower portion of the supplemental frame and over which the coöperating harrow chain 18 is arranged to run.

In Fig. 3, the main counter shaft 25 is shown as provided with a pulley 57, over which a belt 58 may be run, to utilize the power of the engine 22 for various kinds of work, when the machine is not used to cultivate the soil.

The numeral 59 indicates a sheet metal or other thin casing, preferably secured to the main frame.

The operation of the machine is substantially as follows: Under the forward movement of the machine, the front and rear endless harrows may be driven either in the same direction or in opposite directions, and furthermore, they may be driven either at the same or at different speeds, or both at high speeds, or both at low speed. The front harrow prepares the soil for the seed, and the rear harrow will cover the seed and leave a light mulch or dust covering the same. This light mulch or dust surface conserves the moisture and is a well known efficient operation carried out in so-called "dry farming" or in districts having a small amount of moisture. However, it is a desirable operation, even where there is plenty of moisture in the soil. As the rake teeth move continuously in a direction transversely of the movement of the machine, they leave no portion of the surface of the ground untouched, and therefore, produce the most efficient kind of a harrowing action. In other words, they give the soil surface complete disintegrating treatment which results in fine pulverization.

To give better stability to the chains (see Fig. 6), I provide, in some instances, double toothed sprockets 17$^a$, that is sprockets having laterally spaced teeth, and provide the chains 18$^e$ with laterally spaced openings for the teeth of the said sprockets.

What I claim is:

1. The combination with a truck having a main frame with upright posts, of a supplemental frame mounted for vertical sliding movements on said posts of said main frame, connections for vertically moving said supplemental frame, in respect to said main frame, and ground working devices carried by said supplemental frame.

2. The combination with a truck having a main frame with upright posts, of a supplemental frame mounted for vertical sliding movements on said posts of said main frame, connections for vertically moving said supplemental frame in respect to said main frame, ground working devices carried by said supplemental frame, and upper and lower springs interposed between said main frame and supplemental frame for yieldingly resisting movements of said supplemental frame both upward and downward.

3. The combination with a truck having a main frame with tubular posts, of a vertically movable supplemental frame having upright posts working telescopically through the tubular posts of said main frame, connections for vertically moving said supplemental frame in respect to said main frame, and ground working devices carried by said supplemental frame.

4. The combination with a wheel-equipped truck having tubular posts and horizontal connecting bars, of a vertically movable supplemental frame having upright posts and horizontal connecting bars, the posts of said supplemental frame working telescopically through the tubular posts of said main frame, and certain of the horizontal connecting bars of said supplemental frame being above and others being below the upper and lower ends of said tubular posts of said main frame, and ground working devices carried by said supplemental frame.

5. The combination with a wheel-equipped truck having tubular posts and horizontal connecting bars, of a vertically movable supplemental frame having upright posts and horizontal connecting bars, the posts of said supplemental frame working telescopically through the tubular posts of said main frame, and certain of the horizontal connecting bars of said supplemental frame being above and others being below the upper and lower ends of said tubular posts of said main frame, ground working devices carried by said supplemental frame, and springs applied between said main and supplemental frames to counterbalance at least in part the weight of said supplemental frame and parts carried thereby.

6. The combination with a wheel truck having a main frame formed with tubular posts and horizontal connecting bars, of a supplemental frame having posts working telescopically through the tubular posts of said main frame and having horizontal connecting bars located above the upper ends and below the lower ends of the tubular posts of said main frame, ground working devices mounted on said supplemental frame, and a lifting lever carried by said main frame and connected to said supplemental frame for raising and lowering the latter and said ground working devices.

7. In a machine of the kind described, the combination with a main frame and a supplemental frame mounted for vertical movements thereon, of an endless harrow mounted on said supplemental frame for movements transversely of the truck, an engine on said main frame, and means for driving said harrow from said engine, including an engine driven driving sprocket carried by said main frame, a driven sprocket carried by said supplemental frame, a sprocket chain running over said driving and driven sprockets, a slack take-up wheel engageable with said sprocket chain, and means for moving said take-up wheel vertically when the said supplemental frame is moved in respect to said main frame to automatically take up the slack of said main sprocket chain.

In testimony whereof I affix my signature in presence of two witnesses.

HENRY H. KRYGER.

Witnesses:
HARRY D. KILGORE,
F. D. MERCHANT.

Copies of this patent may be obtained for five cents each, by addressing the "Commissioner of Patents, Washington, D. C."